2,984,305
Patented May 16, 1961

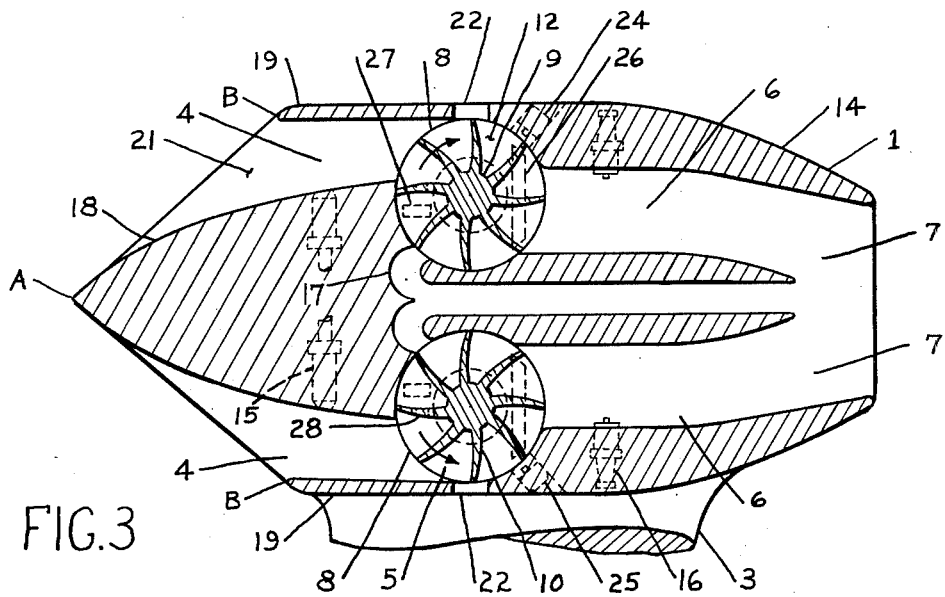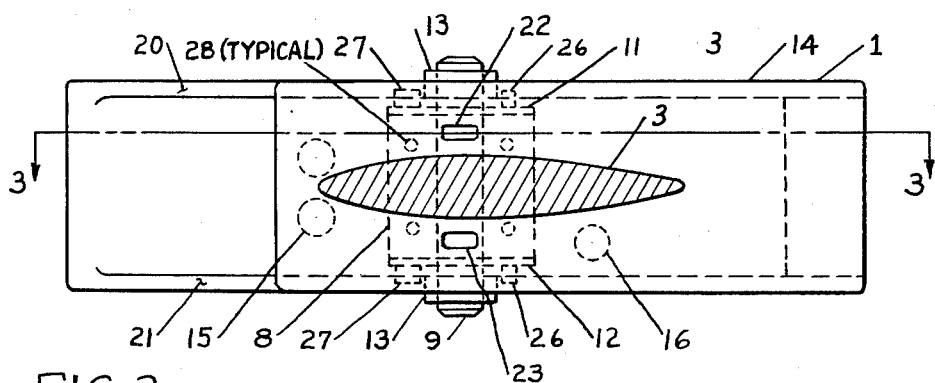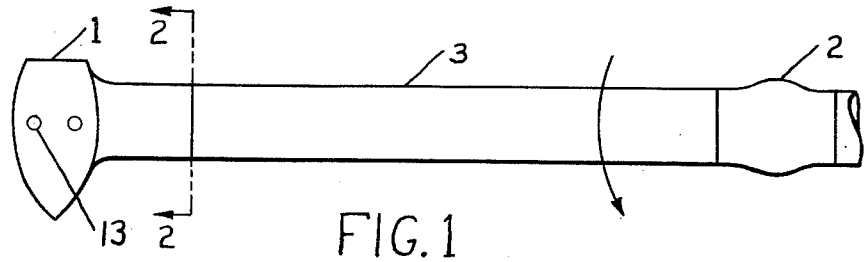

2,984,305

AIRCRAFT LIFTING ROTOR WITH ROTARY VALVE RAM JET ENGINE HAVING EXPLOSION CYCLE

Charles W. Ranson, 7906 Agnew Ave., Los Angeles, Calif.

Filed Nov. 29, 1954, Ser. No. 471,552

4 Claims. (Cl. 170—135.4)

The present invention relates to a jet propulsion engine wherein quantities of atmospheric air are heated and accelerated to provide useful thrust.

The engine as described herein is a ram jet engine suitable for both supersonic and subsonic flight regimes. Under certain fuel-air ratios the engine converts from constant pressure to constant volume combustion cycles.

Objects of the present invention are to provide a high speed ram jet engine of improved combustion efficiency, decreased pressure losses, higher rates of heat release per unit area of combustion chamber area, quick and reliable starting characteristics, and resistance to flame blow-outs over a greater operating range. Other objects are to provide a simple engine of exceptionally short length and small longitudinal moment of inertia to reduce helicopter cyclic pitch control lag when mounted at the outer ends of helicopter blades. Another object is to provide low internal drag by means of a floating fuel-air mixer. Another object is to provide for complete combustion at higher average gas velocities so that the engine can be kept small for greater power output. Other objects are to provide for anti-icing of the inlet duct, and to provide a ram jet engine in which the flame is invisible from the forward end. Another object is to provide a high speed ram jet engine that can also operate on constant volume combustion cycles at lower velocities where pulse jet efficiencies are more favorable. Another object is to provide a variable frequency pulse jet engine in which the combustion pressure ratio is independent of the tail pipe length. Another object is to provide a helicopter rotor blade propelled by a tip mounted engine having a high-speed rotary engine element mounted in a manner to avoid gyroscopic moments being introduced from the engine into the blade during normal operation. Another object is to provide a jet engine with dual counter-rotating vaned rotors mounted at the tip of a helicopter blade in a manner that gyroscopic moments from the rotors caused by blade cyclic pitch control motions are canceled out and isolated from the blade. Other objects and advantages will become apparent as the description proceeds.

An embodiment of the present invention is shown in the appended drawings in which:

Fig. 1 is a plan view of a helicopter rotor including the hub, a blade, and a tip mounted jet engine.

Fig. 2 is a side view of the jet engine taken along line 2—2 of Fig. 1.

Fig. 3 is a plan form section of the engine taken along line 3—3 of Fig. 2.

The prior art has provided the conventional ram jet engine having the fixed V-gutter type of flame holder or its equivalent. This flame holder has pressure losses from flat-plate type drag and from throttling due to flow through a restricted area. This reduces the pressure level of combustion, with a resultant reduction in developed temperature and engine thrust. Additionally, the aerodynamic drag of this type of flame holder is appreciable, resulting in loss of net thrust from the engine. Also flame blow-out occurs above or below a comparatively narrow range of air flows through the engine. The present invention overcomes these deficiencies and provides additional advantages as stated in the objects of the invention. An additional reference to the prior art is set forth in a paragraph several paragraphs preceding the claims.

Referring to Fig. 1, jet engine 1 is shown mounted at the tip end of a helicopter rotor including hub 2 and high speed blade 3.

Referring to Fig. 2 and Fig. 3, engine 1 is shown to be generally symmetrical and to comprise two duct systems and two rotors 8. Either duct system comprises intake port 4, rotor chamber 5, combustion chamber 6, and exhaust port 7. The ducting is preferably rectangular in cross-sectional shape. Ducting for hot gas flow normally includes the ducting downstream of rotor chamber 5.

Rotor 8 is a vaned type rotor and comprises core portion 9, curved vanes 10, and end plates 11 and 12. The core portion 9 is supported to engine housing 14 by sleeve bearings 13 which are press fitted into housing 14 and extend into the air stream for cooling purposes. Rotor 8 is shown to have its axis of rotation perpendicular to the chord plane of the rotor blade, where a chord plane is defined as that plane containing the straight chord lines extending from the leading edges to the trailing edges of the blade transverse sections. This arrangement prevents gyroscopic moments from being introduced into blade 3 by rotor 8 as both elements rotate about hub 2 and as rotor 8 also rotates with respect to blade 3. The elimination of large gyroscopic moments is very important in reducing fatigue stresses in the helicopter rotor as well as in the jet engine structure and bearings. In conventional practice, jet engine rotors are mounted with the axis of rotation parallel to the chord plane of the supporting aircraft wing which leads to gyroscopic moments in the wing as the wing revolves about its root end.

In conventional helicopters, both lateral and longitudinal control are obtained by changing the blade pitch cyclically to tilt the resultant lift vector of the lifting rotor. Thus the blades experience hundreds of changes of blade angle each minute of forward flight. These cyclic pitch changes cause gyroscopic moments from a rotor 8 as in Fig. 3. However by mounting twin rotors 8 having opposite directions of rotation, gyroscopic moments due to blade cyclic pitch changes are canceled out through the engine housing and no gyroscopic moments reach rotor blade 3 to cause blade fatigue stresses or to cause blade torsional twist and reduced helicopter control.

As helicopter blade 3 revolves, the dynamic impact of inlet air in inlet port 4 forces rotor 8 to revolve at high speed.

As air at a high total pressure in inlet port or diffuser 4 flows to lower ambient pressure through ports 22 and 23 the momentum of the air is changed through deflection by vanes 10 and a rotative torque results on rotor 8. Transverse holes 28 in each of vanes 10 allow a small amount of inlet air leakage resulting in increased rotor speeds due to air drag. Fuel nozzles 15 provide a mixture that passes into combustion chamber 6 where it is ignited by spark plug 16.

The expanding hot gases are ejected at high velocity through exhaust port 7. Portions of the hot exhaust gases are trapped between revolving vanes 10 of the rotor and are partially evacuated through auxiliary exhaust duct 17 which is under suction pressure due to the ejector pumping action of the main exhaust gases leaving ports 7. The bend in duct 17 deflects exhaust gases and absorbs thrust due to momentum change. The remaining residual exhaust gases between vanes 10 are at low pressure and high temperature, and these gases when quenched by the cool inlet air from inlet port 4 contract to a very small relative volume so that the mass flow of fresh charges through the duct system is substantially unaffected by exhaust products.

Rotor 8 functions as a fuel-air mixer and as a floating flame holder. The resistance of rotor 8 with good bearings is considerably less than that of conventional fixed flame holders which have flat-plate drag.

Vaned rotor 8 is beneficial as a combustion promoter. Turbulence is created without a throttling effect. Vortices roll off of vanes 10 at inlet port 4 as well as at combustion chamber 6. This provides an intimate interlacing of zones of fuel vapor and zones of oxygen-bearing air so that the union of fuel and oxygen is greatly accelerated. Combustion is completed in a smaller volume and at higher velocities so that the heat output of the engine can be increased or the size of the engine can be decreased. Also, efficiency is increased since less unburned fuel is allowed to be exhausted due to more rapid and homogeneous mixing of fuel and air and complete combustion.

The center line of combustion chamber 6 is off-set from the axis of rotation of rotor 8 to provide a longer flow path and to allow more time for thorough mixing of fuel and air. This is an important feature of the invention since increased mixing time adds materially to increased combustion efficiency. Though the flow path is lengthened, the overall engine length is kept small.

The present engine can be operated under certain conditions on pulse jet engine principles. Within certain rotor speed ranges for a given tail pipe length and for a certain range of fuel-air ratios the engine will operate on periodic explosions. Thrust will increase and fuel consumption will decrease under these conditions. However, with the rotor driven by ram air the rotor speed and hence explosion frequency is a function of air speed. Tail pipe resonant frequencies are a function of tail pipe length and hence the tail pipe length must normally be automatically adjustable in order to be in phase with the explosion frequency and thereby provide tail pipe resonant compression in the combustion chamber. To circumvent this requirement for an automatically adjustable telescoping tail pipe, the present invention provides a supplementary way for obtaining confined explosions, i.e. constant volume combustion, and without sacrificing the important feature of steady flow through the engine. Referring to Fig. 3, glow plugs 24 and 25 are shown imbedded in the respective rotor chamber walls, so that as rotor spaces between vanes 10 move into position, a confined explosion occurs. The trapped gases burn rapidly at constant volume and then are released by the revolving rotors into hot gas ducting or combustion chamber 6 where any residual wisps of unburned mixture are burned. In the present configuration, it is contemplated to use constant volume combustion by the use of an appropriate fuel rate and glow plugs 24 and 25, which are heated by an electrical system not shown, for rapidly accelerating the helicopter rotor at flat pitch up to speed and for hovering flight where power requirements are high and where air flow through tip mounted engines is steady. It is then contemplated in high forward speed helicopter flight to switch off electric current to the glow plugs, or optionally spark plugs, and to operate on ram jet principles since ram jet efficiencies are favorable at high air speeds. Moderate speed helicopters can operate continuously on the explosion cycle. Fixed-wing aircraft can use the explosion cycle for take off and acceleration and the constant pressure cycle for transonic and supersonic flight. Other applications and modes of operation of the subject engine are optional to suit the requirements of any particular aircraft.

Optimum performance occurs when developed pressures are not dissipated by fluid leakage around the ends of rotor 8. Hence seals 26 and 27 are strips of graphited sealing material imbedded in engine walls 20 and 21 to minimize the clearance between end plates 11 and 12 of rotor 8 and the engine walls, as shown by dotted lines in Figs. 2 and 3.

A multiplicity of vanes 10 on rotor 8 is essential to the described operation of the invention. In the prior art a pulse jet engine has been provided with a butterfly valve in a straight pipe section, and the butterfly valve, which was two bladed as in conventional stove pipe design, was motor driven at constant speed at the speed of tail pipe resonant frequency. The present multi-vaned rotor is an advance over said prior art by providing for continuous airflow resulting in greater air mass handled per unit combustion chamber area and greater developed thrust. Additionally the multi-vaned rotor reduces pressure losses by the substantial elimination of throttling, provides a vastly more effective flame holder, prevents back flow during explosions and resultant losses in developed thrust, provides for absorption of combustion pressures over complete cycles of operation, yields a lower noise level on the pulse cycle by operating at high frequency and lower amplitude, allows for constant volume combustion and hence higher heat release and higher thrust from a given amount of fuel by permitting ignition within a segment of rotor rotation independently of tail pipe length, and other advantages as discussed elsewhere herein. The curved vanes of the multi-vaned rotor, as shown in Fig. 3, contribute to higher rotor efficiency in absorbing kinetic energy for rotor rotation fom the inlet air, although said vanes may be staight or otherwise shaped.

Twin inlet ports 4 are defined by center wedge 18, outer walls 19 and upper and lower walls 20 and 21. Inlet ports 4 can be designed as nozzles or diffusers as the particular installation warrants. In subsonic flights, the wedge inlet design results in increased mass flow through the engine since deflected air is funneled by walls 19 and wedge 18 into the engine ducting. Increased flow results in greater maximum engine thrust. In supersonic flight, oblique shock waves are reflected at forward edge A of wedge 18 and normal shock waves are reflected at the forward edges B of walls 19 so that supersonic diffusion results in accordance with conventional supersonic theory. The flow aft of the normal shock wave is subsonic and port 4 functions as a subsonic diffuser to decrease velocity and increase static pressure. The rotative speed of rotor 8 can be predetermined at design airspeed by proportioning diffuser port 4.

For optimum engine performance, the rotor chamber at sections perpendicular to the transverse axis of rotation should be arced to conform to the rotationally generated periphery of the rotor as shown in Fig. 3. This provides advantages such as an improved fluid seal, and improved flame holder, and less throttling pressure losses. However, the arc portions of the conforming chamber contour can be approximated by a series of chords or sections of cycloids or parabolas, etc. allowing some fluid leakage and loss of efficiency and yet reside within the scope of the invention. In general, the term chamber connotes arced walls suitable for the purpose intended.

While I have shown only one embodiment of my invention, it is to be understood that other embodiments may be equivalents and what is desired to be protected by Letters Patent is defined by the appended claims.

What is claimed is:

1. In an aircraft lifting rotor, a hub, an elongated blade of airfoil cross-sectional form, means for connecting said blade to said hub, a reaction propulsion unit positioned outwardly with respect to said blade, means for structurally associating said propulsion unit with said blade, said propulsion unit including two propulsion unit rotors, each of said propulsion unit rotors including a core portion and a plurality of radially extending appendages, said propulsion unit rotors rotatably disposed in said propulsion unit about substantially parallel axes of rotation, and said parallel axes of rotation of said propulsion unit rotors arranged to be substantially parallel normally to the axis of rotation of said aircraft lifting rotor, and said propulsion unit rotors arranged for rotation normally in opposite rotative directions.

2. In an aircraft lifting rotor, a hub, an elongated blade of airfoil cross-sectional form, means for connecting said blade to said hub, a reaction propulsion unit positioned outwardly with respect to said blade, means for structurally associating said propulsion unit with said blade, said propulsion unit including two propulsion unit rotors, each of said propulsion unit rotors including a core portion and a plurality of radially extending appendages, said propulsion unit rotors rotatably disposed in said propulsion unit about substantially parallel axes of rotation, and said parallel axes of rotation of said propulsion unit rotors arranged to be substantially perpendicular to the chord plane of said elongated blade, and said propulsion unit rotors arranged for rotation normally in opposite rotative directions.

3. In an aircraft lifting rotor, a hub, an elongated blade of airfoil cross-sectional form, means for connecting said blade to said hub, a reaction propulsion unit positioned outwardly with respect to said blade, means for structurally associating said propulsion unit with said blade, said propulsion unit including two propulsion unit rotors, each of said propulsion unit rotors including a core portion and a plurality of radially extending appendages, said propulsion unit rotors rotatably disposed in said propulsion unit about axes of rotation substantially perpendicular to the chord plane of said elongated blade, said axes of rotation of non-collinear relation, and said propulsion unit rotors arranged for rotation normally in opposite rotative directions.

4. In an aircraft lifting rotor, a hub, an elongated blade of airfoil cross-sectional form, means for connecting said blade to said hub, a reaction propulsion unit positioned outwardly with respect to said blade, means for structurally associating said propulsion unit with said blade, said propulsion unit including two propulsion unit rotors, each of said propulsion unit rotors including a core portion and a plurality of radially extending appendages, said propulsion unit rotors rotatably disposed in said propulsion unit about respective axes of rotation, and said axes of rotation of said propulsion unit rotors arranged to be substantially parallel normally to the axis of rotation of said aircraft lifting rotor, and said propulsion unit rotors arranged for rotation normally in opposite rotative directions.

References Cited in the file of this patent
UNITED STATES PATENTS

| | | |
|---|---|---|
| 2,433,107 | Forsyth | Dec. 23, 1947 |
| 2,462,587 | Wilcox | Feb. 22, 1949 |
| 2,474,359 | Isacco | June 28, 1949 |
| 2,601,463 | Stanley | June 24, 1952 |
| 2,843,210 | Grove | July 15, 1958 |